Figure 1:
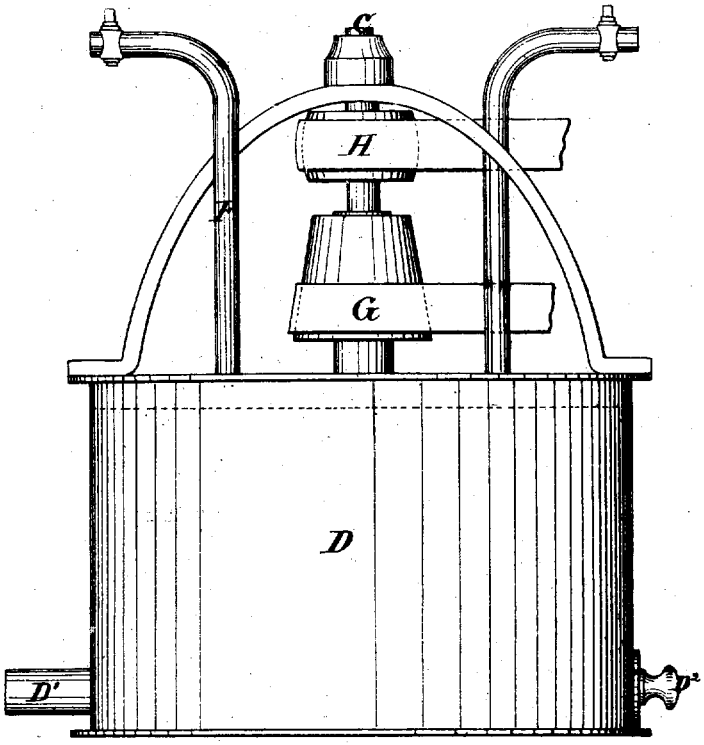

FREDERICK LAMBE.

Improvement in Processes and Apparatus for Purifying Paraffine and other Substances.

No. 4,397. Reissued May 23, 1871.

Witnesses.
Phil. F. Larner
F. A. Jackson

Inventor.
F. Lambe.
Wm. Cattell
Attorney.

United States Patent Office.

FREDERICK LAMBE, OF LONDON, ENGLAND.

Letters Patent No. 102,135, dated April 19, 1870; patented in England, December 4, 1868; reissue No. 4,397, dated May 23, 1871.

IMPROVEMENT IN PROCESSES AND APPARATUS FOR PURIFYING PARAFFINE AND OTHER SUBSTANCES.

The Schedule referred to in these Letters Patent and making part of the same.

*To all whom it may concern:*

Be it known that I, FREDERICK LAMBE, of London, England, have invented certain new and useful Improvements in the Process of Treating and Purifying Paraffine for obtaining it in crystals, and in Machinery used therewith for Washing and Drying the same; and I do hereby declare that the following specification, taken in connection with the drawing making a part of the same, is a full, clear, and exact description thereof.

This invention relates to a novel mode of treating and purifying paraffine in the condition of loose crystals, the object being to expedite and economize the operations of separating the crystals from the fluid with which they may be naturally or otherwise associated, and of washing and drying the crystals.

To this end I first submit the mixture of paraffine and oil to the action of a centrifugal apparatus, acting on the principle of what is known as the hydro-extractor, by which means the solid paraffine is separated from the oil, the paraffine being retained within the apparatus, and the liquid or oil passing away through the pervious sides of the same, in obedience to the centrifugal law.

Figure 1 is a side view of the apparatus.

Figure 2:
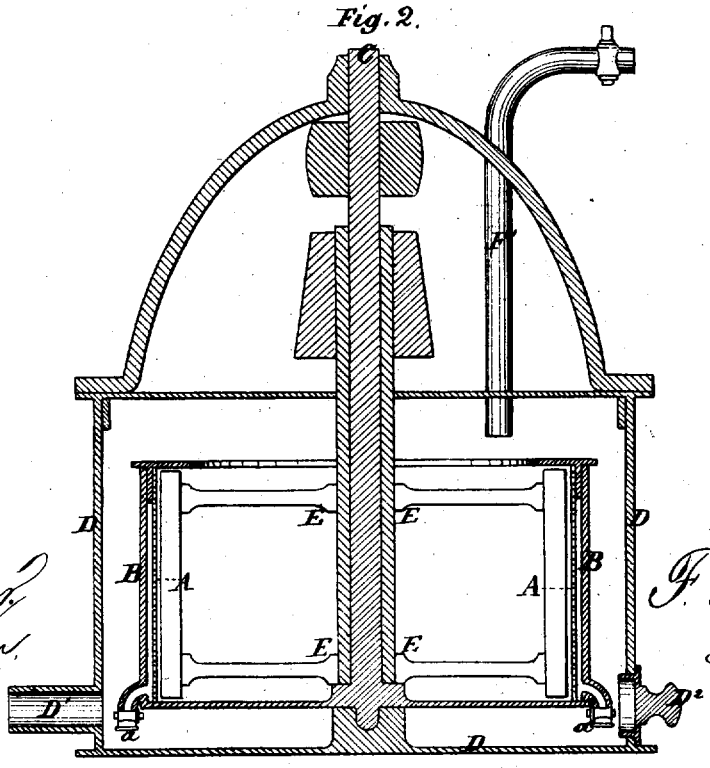

Figure 2, a transverse vertical section.

Like letters of reference refer to like parts in the different views.

In fig. 2 the pervious periphery, shown at A A, I form as an inner lining to a rotating tight vessel or case, B, which is carried by a vertical shaft, C, mounted in suitable bearings. This case B serves to retain the liquid in the rotary portion of the apparatus while the washing is taking place.

D is a fixed casing inclosing the vessel B, and carrying the top bearing for the central shaft C.

The case D is closed at the top, but it has an opening, $D^1$, at bottom, through which the contents of the vessel are from time to time discharged. It is also provided with doors, $D^2$, to allow of access to the taps or valves *a a*, with which the vessel B is furnished near its lower edge for discharging the liquid at intervals, as found desirable.

I also prefer to mount upon the central shaft C a sleeve-shaft, E, fitted with radial arms, which carry blades that are set parallel to and in such position as to clear the pervious periphery over which they rotate of adhering crystals without rubbing the periphery A.

These blades receive an independent rotary motion through a cone-pulley, which allows of the adjustment of the driving-strap G, fig. 1, to alter the speed of rotation, as may be desired.

The strap H, fig. 1, gives motion to the central shaft and to the vessel which it carries.

The machine is fed previous to commencing the washing of the paraffine through a pipe, F, fig. 1, supplied from a reservoir above, and, as the operation proceeds, fresh naphtha is admitted from time to time to the vessel B by the pipe F', figs. 1 and 2.

The action of the machine will be to drive the liquid through the crystals, which will be kept in constant agitation, and so soon as the taps *a a* are opened and the liquid is allowed to escape it will be expelled from the vessel B, and, collecting at the bottom of the case D, will run out at $D^1$.

A fresh supply is then to be admitted, and the washing is then to be repeated. After the washing has been continued a sufficient time, and the naphtha, petroleum, spirit, or other solvent has been driven off by centrifugal action, hot water or steam, or hot air, may be admitted, which, melting the crystal, will allow of the paraffine being run off from the apparatus in a liquid state. The paraffine is then to be freed from all trace of naphtha by steam, and finished in the usual manner.

The crystals of paraffine which have been separated from the oil, or loose crystal obtained from any source or in any stage of purity, I now subject to repeated washings in cold naphtha, petroleum, spirit, or any other liquid capable of dissolving or taking up the impurity by which the paraffine is more or less accompanied.

After each washing of the crystals I separate the solid paraffine from the liquid, by preference by means of the centrifugal apparatus shown at fig. 2, or the separation may be effected by filtration or pressure; but if pressure is used, and it is intended to wash the crystals again, such slight pressure only must be used as will allow of the crystals being easily separated one from another in the subsequent washing. This washing with cold solvents may be repeated as frequently as may be necessary.

The centrifugal apparatus I employ is preferably so arranged that fresh portions of the solvent liquid may be added without first removing the paraffine from the apparatus. In practice I find the best mode of procedure, when refining the ordinary crude paraffine of commerce, to be as follows:

I take crude paraffine, and having melted it in a suitable vessel, I allow the mechanical impurities to subside, and then run off the liquid clarified paraffine into another vessel, where I add to it an equal quantity of naphtha or other like solvent, and, having well stirred them together, I allow the mixture to cool. When the mixture has cooled the crystals will be found to be well defined. I then force the mixture through the meshes of a coarse sieve, so as to break up any lumps of cohering crystals, and afterward transfer it to the centrifugal apparatus. After separating the liquid I add to the crystals remaining in the machine about sixty per cent. of naphtha, and stir them well together, so as to wash the crystals thoroughly. The naphtha is then separated as before, and this operation, with fresh portions of naphtha, is continued until the crystals are sufficiently white and pure.

In order to economize the quantity of naphtha the naphtha used in the final washing is used again and again for washing the crystals in a less advanced stage of purification; and after it has been used in each stage of washing it is mixed with the melted crude paraffine instead of clean naphtha.

By this method of washing the paraffine crystals with cold menstruums, and separating the same from the liquid by the centrifugal apparatus, great economy and expedition are attained over all other processes at present in use.

When volatile liquids are used in washing the paraffine, as described, it is desirable to carry on the operation in closed vessels to avoid the loss of the volatile material and danger by fire.

While the apparatus above described is specially adapted for washing and drying the crystals of paraffine, it is quite evident that the same, or a substantial and material part thereof, may be advantageously used in washing any other substance or material in a hydrocarbon or other volatile solvent, and in subsequently expelling the solvent agent therefrom. In case, however, material is to be treated which cannot, from its nature, be introduced into the apparatus through the pipe F, the top of the case D should be provided with a suitable opening capable of being closed by a tightly-fitting cover.

What I claim as my improvement, and desire to secure by Letters Patent, is—

1. The mode of treating and purifying paraffine, as above described.

2. The revolving blades or beaters, and pervious periphery A, in combination with the case D, arranged and operating substantially as and for the purpose set forth.

3. In combination with a centrifugal extractor, A A, the employment of a close cistern or jacket, D, as described, whereby such apparatus is adapted for use in washing and drying crystals of paraffine, or other substances or materials which have been treated with hydrocarbon or volatile solvents, substantially as set forth.

FREDERICK LAMBE.

Witnesses:
JAMES WADE, Jr.,
L. E. HOLDEN.